(12) United States Patent
Tanaka et al.

(10) Patent No.: US 6,771,248 B2
(45) Date of Patent: Aug. 3, 2004

(54) DISPLAY MODULE

(75) Inventors: Shigeki Tanaka, Nara (JP); Yoshinori Ogawa, Yamatotakada (JP)

(73) Assignee: Sharp Kabushiki Kaisha, Osaka (JP)

( * ) Notice: Subject to any disclaimer, the term of this patent is extended or adjusted under 35 U.S.C. 154(b) by 286 days.

(21) Appl. No.: 09/983,503

(22) Filed: Oct. 24, 2001

(65) Prior Publication Data

US 2002/0050968 A1 May 2, 2002

(30) Foreign Application Priority Data

Oct. 27, 2000 (JP) ........................................ 2000-329592

(51) Int. Cl.⁷ ............................ G09G 3/36; G09G 5/00; G02F 1/136
(52) U.S. Cl. ........................ 345/100; 345/206; 349/42
(58) Field of Search ...................... 345/55, 64, 66–68, 345/71, 80, 87, 94, 98–100, 103, 104, 204–206, 208, 211, 214; 315/169.3; 349/39, 42, 49, 52, 54

(56) References Cited

U.S. PATENT DOCUMENTS

| | | | | |
|---|---|---|---|---|
| 5,028,916 A | * | 7/1991 | Ichikawa et al. | 345/90 |
| 5,287,095 A | * | 2/1994 | Kitazima et al. | 345/99 |
| 6,011,607 A | * | 1/2000 | Yamazaki et al. | 349/153 |
| 6,355,942 B1 | * | 3/2002 | Yamazaki et al. | 257/72 |
| 6,380,918 B1 | * | 4/2002 | Chiba et al. | 345/90 |
| 6,456,271 B1 | * | 9/2002 | Tamai et al. | 345/100 |
| 6,496,169 B1 | * | 12/2002 | Mametsuka | 345/87 |
| 6,580,405 B1 | * | 6/2003 | Yamazaki et al. | 345/7 |

FOREIGN PATENT DOCUMENTS

| | | | |
|---|---|---|---|
| JP | A 6-3684 | 1/1994 | ......... G02F/1/1345 |
| JP | 11-150227 | 6/1999 | ........... H01L/23/52 |
| JP | 2000165215 A | * 6/2000 | ............ H03K/5/12 |
| JP | A 2000-242240 | 9/2000 | ............ G09G/3/36 |
| KR | 2000-0048158 | 7/2000 | |
| KR | 2000-0053422 | 8/2000 | |
| KR | 2000-0062443 | 10/2000 | |

OTHER PUBLICATIONS

11–150227—Japanese Publication of Unexamined patent Application (Tokukaihei)—Translation of Relevant Passages of the Document.

* cited by examiner

*Primary Examiner*—Bipin Shalwala
*Assistant Examiner*—Jeff Piziali
(74) *Attorney, Agent, or Firm*—Birch, Stewart, Kolasch & Birch, LLP.

(57) ABSTRACT

A display module of the present invention includes a liquid crystal panel driven by a driving signal in a column direction and a driving signal in a row direction; a source driver for supplying the driving signal in the column direction; a gate driver for supplying the driving signal in the row direction; a TCP type film provided with the source driver; a TCP type film provided with the gate driver; and a controller circuit for controlling the gate driver and the source driver, which is installed on the TCP type film together with the source driver or the gate driver. With this structure, the number of parts can be reduced, achieving miniaturization, weight reduction, and cost reduction.

14 Claims, 15 Drawing Sheets

BACKLIGHT

DISPLAY MODULE

FIELD OF THE INVENTION

The present invention relates to, for example, a display module which can be adopted to a liquid crystal display module.

BACKGROUND OF THE INVENTION

A TFT (Thin Film Transistor) liquid crystal display module has been known as a conventional display module. Referring to FIG. 13, its structure will be explained. Here, a module means an independent unit which meets requirements for constituting a large system such as a TV set or a personal computer, just by combining these units.

As shown in FIG. 13, a conventional TFT liquid crystal module 101 is composed of a controller 102, a gate electrode driving circuit 103, a source electrode driving circuit 104, and a liquid crystal panel 105. The controller 102 is equipped with a liquid crystal driving power source circuit 106. The gate electrode driving circuit 103 has a gate driver group including gate drivers GD1 through GDm. The source electrode driving circuit 104 has a source driver group including source drivers SD1 through SDn.

The controller 102 controls the generation of scanning pulses in the gate electrode driving circuit 103, and the timing of N-bit display data signals and driving control signals in the source electrode driving circuit 104. The controller 102 performs the timing control based on synchronization signals (vertical and horizontal synchronization signals) supplied from an external device (host system).

The liquid crystal driving power source circuit 106 in the controller 102 receives power from an external source, and supplies power to a common electrode for the gate electrode driving circuit 103, the source electrode driving circuit 104, and the liquid crystal panel 105.

The gate drivers GD1 through GDm in the gate electrode driving circuit 103 are high power output drivers driving gate bus lines Bgs shown in FIG. 6, provided in the liquid crystal panel 105 in a horizontal direction. Each of the gate drivers GD1 through GDm is composed of a LSI chip. Each LSI chip has a TCP (Tape Carrier Package) form so as to connect its input/output terminals to electrodes of other components. That is, each of the gate drivers GD1 through GDm is installed on a film called a tape carrier in which copper foil wiring is laid out at minute intervals on an insulation film. Each of the gate drivers GD1 through GDm is sealed with a resin provided for fixing the LSI chip and for protecting the LSI chip from moisture.

The source drivers SD1 through SDn of the source electrode driving circuit 104 are high power output drivers driving source bus lines Bs's shown in FIG. 6, provided in the liquid crystal panel 105 in a vertical direction. Each of the source drivers SD1 through SDn also has a TCP (Tape Carrier Package) form so as to connect its input/output terminals of the LSI chip to electrodes of other components.

Next, the following description will describe a specific installation structure of the conventional liquid crystal display module. The liquid crystal display module shown in FIG. 14 has cascaded two gate drivers GD1 and GD2, and cascaded eight source drivers SD1 through SD8. Each of these source drivers SD1 through SD8 and the gate drivers GD1 and GD2 is composed of a LSI chip.

The gate drivers GD1, GD2 are provided on a common wiring substrate 111 which is common to these gate drivers. Likewise, the source drivers SD1 through SD8 are provided on a common wiring substrate 112 which is common to these source drivers. These common wiring substrates 111 and 112 supply common signals and power to the gate drivers GD1, GD2 and the source driver SD1 through SD8. The controller 102 is provided on a controller substrate 113, which is a substrate different from the common wiring substrates 111 and 112. Incidentally, a material with reference numeral 114 is a TCP type film having wiring, and a material with reference numeral 115 is a flexible substrate for connecting the wires of the controller substrate 113 with the wires of the common wiring substrates 111 and 112.

Wires on the TCP type film 114 and ITO (Indium Tin Oxide) wires on the liquid crystal panel 105 are connected by thermocompression bonding at a fringe section 105a of the liquid crystal panel 105, via an ACF (Anisotropic Conductive Film). Meanwhile, the electrical connections between the wires on the TCP type film 114 and the common wiring substrates 111 and 112, and between the controller substrate 113 and the common wiring substrates 111 and 112 are established by soldering or by the ACF method. The common wiring substrates 111 and 112 and the controller substrate 113 are made of, for example, multi-layer glass epoxy substrates.

Next, FIG. 15 shows another liquid crystal display module. In this liquid crystal display module, the common wiring substrates 111 and 112 are eliminated by using internal wires in LSI chips. This liquid crystal display module is disclosed in Japanese Unexamined Patent Publication No. 6-3684/1994 (Nishioka 6-3684/1994, published on Jan. 14, 1994), applied by the same applicant of the present invention. In the liquid crystal display module, the gate drivers GD1, GD2 and the source drivers SD1 through SD8 are respectively installed on different TCP type films 114. The electrical connection between the adjacent TCP type films 114 is established by overlapping the ends of the wires of the TCP type films 114.

Also in this example, the controller 102 is provided on an independent controller substrate 116, which is made of glass, an epoxy substrate, or a flexible substrate. The controller 102 is connected to the gate drivers GDs and the source drivers SDs via a flexible substrate, by means of the ACF method and soldering.

Another example for electrically connecting the adjacent TCP type films 114 is disclosed in Japanese Unexamined Patent Publication No. 2000-242240/2000 (Tamai et al. 2000-242240, published on Sep. 8, 2000), applied by the same applicant of the present invention. In this example, the foregoing connection is established using a separately provided film substrate having wiring only, or ITO wires for connection provided on the liquid crystal panel 105, by an ACF method or soldering.

However, recently, a lower priced, and downsized liquid crystal display module has been increasingly demanded in the market, which requires further consideration. Thus, in order to reduce the total cost of a liquid crystal display module and achieve downsizing, a maximized reduction in weight, the number of parts, and wires required in a display driving device including a controller which especially performs plenty of signal transmission, has been strongly desired.

SUMMARY OF THE INVENTION

The object of the present invention is provide a display module which achieves a small and light-weight structure by reducing the number of parts, and achieves cost reduction.

To obtain the foregoing object, a display module in accordance with the present invention includes:

a display device driven by a driving signal in a column direction and a driving signal in a row direction;

a first driving device for supplying the driving signal in a column direction;

a second driving device for supplying the driving signal in a row direction;

a first wiring substrate for mounting thereon the first driving device;

a second wiring substrate for mounting thereon the second driving device; and a control device for controlling the first and the second driving devices, which is installed on the first or the second wiring substrate together with the first or the second driving device.

According to the foregoing structure, the control device for controlling the first and the second driving devices is installed on the first or the second wiring substrate together with the first or the second driving device. Therefore, the structure eliminates the need for a wiring substrate for installing the control device only, achieving the reduction in the number of parts and cost reduction. Further, the structure does not require space for providing the wiring substrate exclusive for installing the control device, achieving miniaturization.

For a fuller understanding of the nature and advantages of the invention, reference should be made to the ensuing detailed description taken in conjunction with the accompanying drawings.

DESCRIPTION OF THE PREFERRED EMBODIMENTS

Referring to FIGS. 1 through 12, the following description will describe an embodiment of the present invention.

Figure 1:
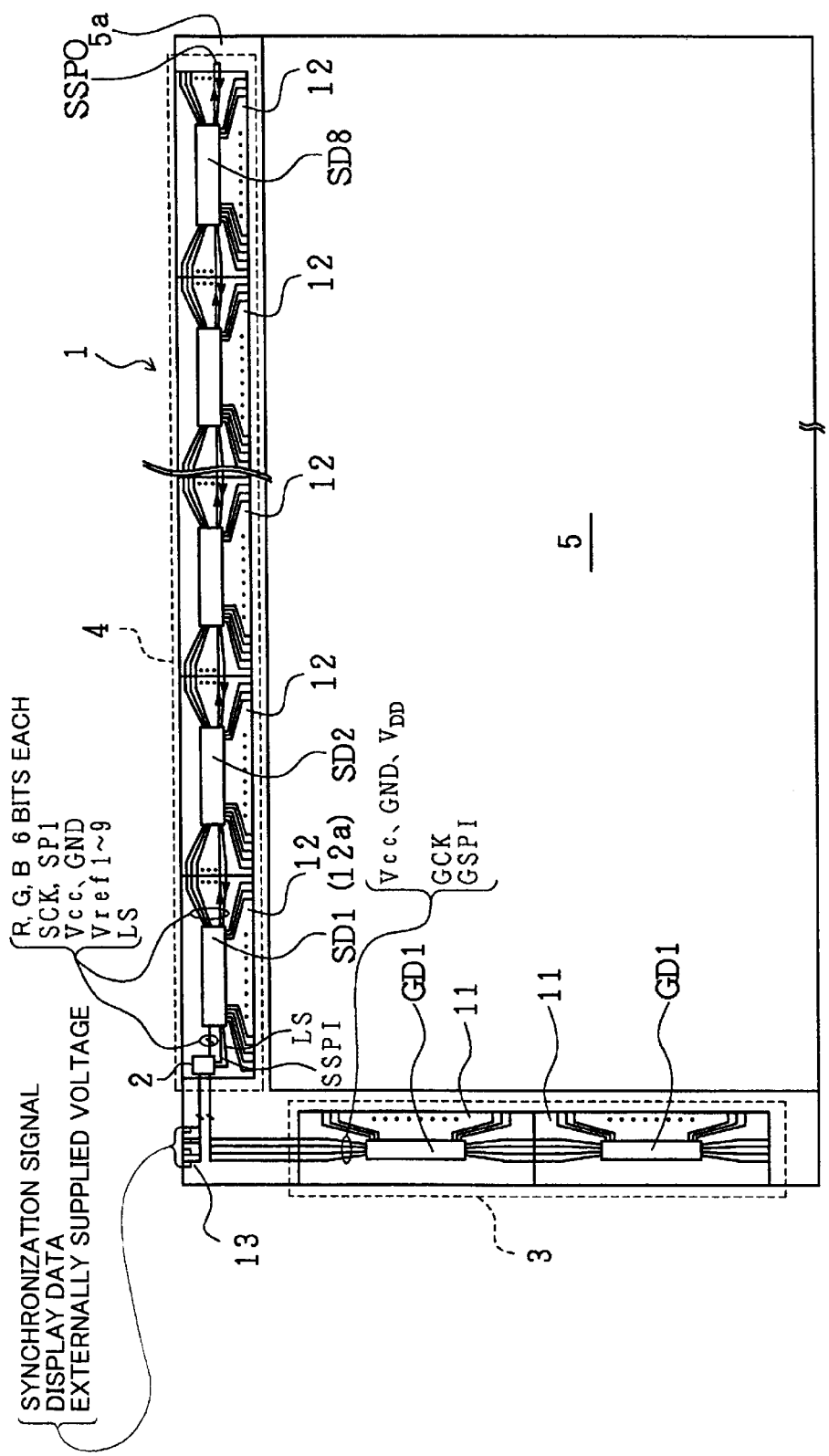
FIG. 1 is an explanatory view showing a structure of a liquid crystal display module in one embodiment of the present invention.

A display module of the present embodiment is structured as a TFT liquid crystal display module 1 shown in FIG. 1. The TFT liquid crystal display module 1 is provided with a controller circuit (control device) 2, a gate electrode driving circuit 3, a source electrode driving circuit 4, and a liquid crystal panel 5. The gate electrode driving circuit 3 has a gate driver group including gate drivers (second driving devices) GD1 and GD2 which are cascaded so as to be sequentially connected. The source electrode driving circuit 4 has a source driver group including source drivers (first driving devices) SD1 through SD8 which are cascaded so as to be sequentially connected.

The controller circuit 2 controls the generation of scanning pulses in the gate electrode driving circuit 3, and the timing of N-bit display data signals and driving control signals in the source electrode driving circuit 4. This timing control is performed based on synchronization signals (vertical and horizontal synchronization signals) supplied from an external device (host system).

Figure 6:
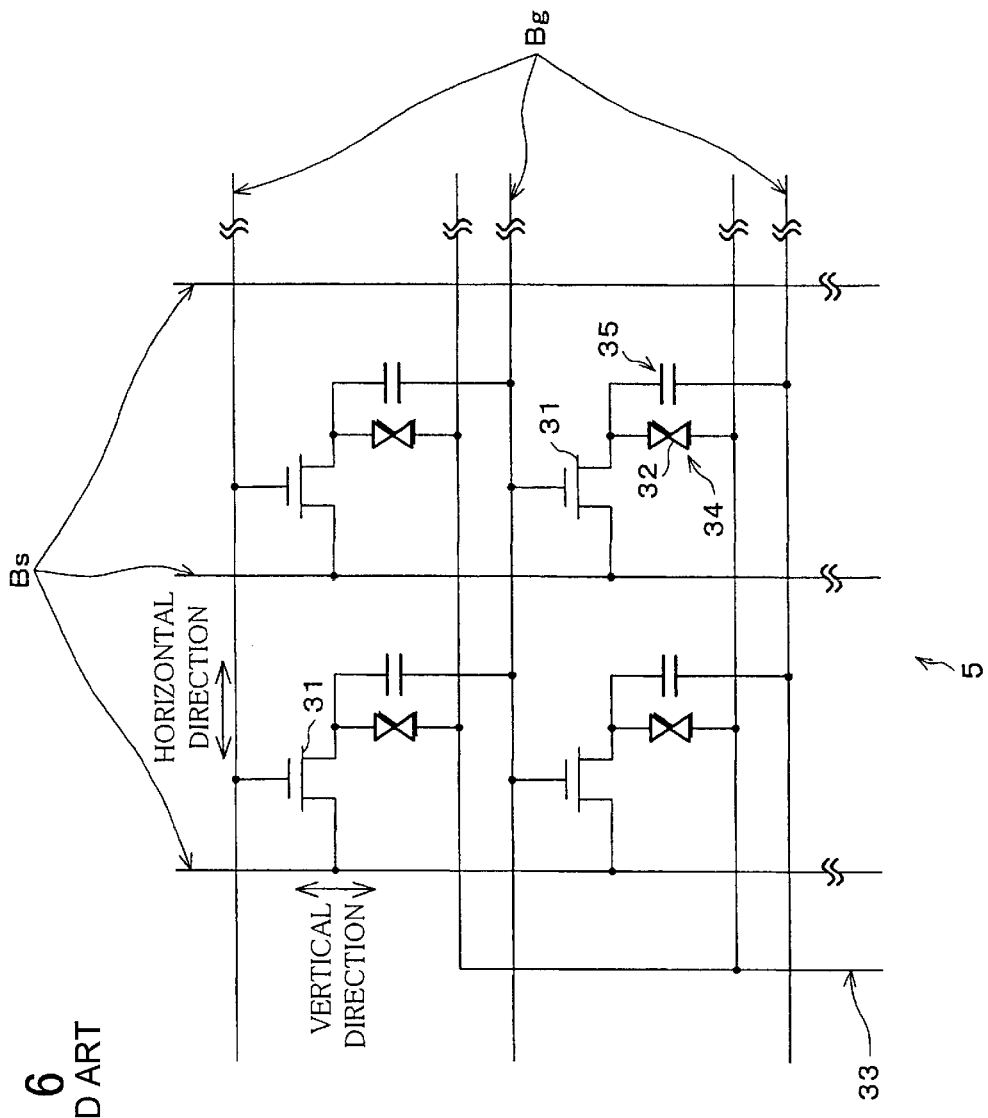
FIG. 6 is an equivalent circuit diagram of a main part of a liquid crystal panel shown in FIG. 1.

The gate drivers GD1 and GD2 in the gate electrode driving circuit 3 are high power output drivers driving gate bus lines Bgs shown in FIG. 6, provided in the liquid crystal panel 5 in a horizontal direction (row direction). The source drivers SD1 through SD8 of the source electrode driving circuit 4 are high power output drivers driving source bus lines Bs's shown in FIG. 6, provided in the liquid crystal panel 5 in a vertical direction (column direction).

Each of the gate drivers GD1, GD2 and the source drivers SD1 through SD8 is composed of a LSI chip. As mentioned above, the LSI chip for the gate drivers GD1 and GD2 is provided on an insulating TCP (Tape Carrier Package) type film (a second wiring substrate) 11, having a TCP structure. Likewise, the LSI chip for the source drivers SD1 through SD8 is provided on an insulating TCP type film (a first wiring substrate) 12, having a TCP structure.

The gate electrode driving circuit 3 and the source electrode driving circuit 4 are provided at a fringe section 5a of the liquid crystal panel 5. The fringe section 5a is formed along adjacent vertical and horizontal sides in the periphery of the liquid crystal panel 5. At the fringe section 5a, the gate drivers GD1 and GD2 and the source drivers SD1 through SD8 are connected to ITO terminals of the fringe section 5a via an ACF, by means of thermocompression bonding, and are fixed.

Figure 2:
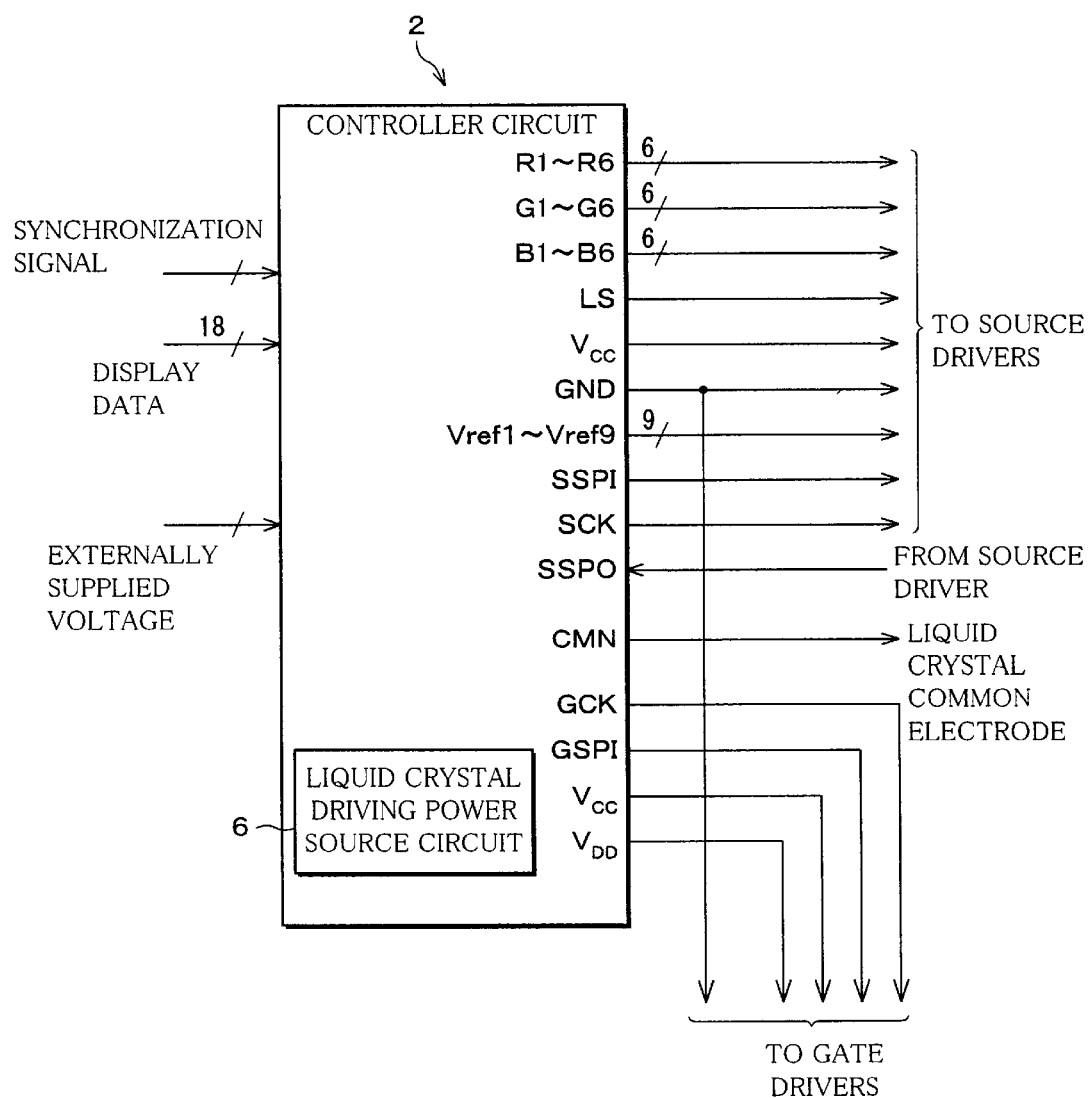
FIG. 2 is an explanatory view showing input/output signals to/from a controller circuit shown in FIG. 1.

As shown in FIG. 2, the controller circuit 2 is provided with various input/output terminals and a liquid crystal driving power source circuit 6. The controller circuit 2 receives synchronization signals (vertical and horizontal synchronization signals) required for driving the liquid crystal panel 5, digital display data, and a voltage for generating various types of voltage, from an external device (host system). Then, the controller circuit 2 supplies various control signals, that is, a start pulse signal SSPI, a clock signal SCK, and a latch signal LS for the source drivers SD1 through SD8; and a start pulse signal GSPI and a clock signal GCK for the gate drivers GD1 and GD2. Further, the controller circuit 2 supplies digital display data DATA·RGB (6-bit data for each of Red, Green, and Blue) to the source drivers SD1 through SD8, controlling the transfer timing. The controller circuit 2 receives a start pulse output signal SSPO from the source driver SD8, the last stage of the cascade connection. The liquid crystal driving power source circuit 6 of the controller circuit 2 supplies a negative voltage VDD, a source voltage Vcc, and a grounding voltage GND to the gate drivers GD1 and GD2. The liquid crystal driving power source circuit 6 of the controller circuit 2 supplies Vcc, GND, and reference voltages Vref1 through Vref9 for gradation display to the source drivers SD1 through SD8. Further, the liquid crystal driving power source circuit 6 of the controller circuit 2 supplies a voltage for common electrode to a common electrode 33 of the liquid crystal display 5.

The controller circuit 2 (controller LSI chip) is installed on a TCP type film 12a, one of the TCP type films 12 shown in FIG. 1 where the first source driver SD1 is provided, together with the source driver SD1. Thus, the TCP type film 12a has a combined TCP structure.

Input terminals 13 to the controller circuit 2, that is, to the TCP type film 12a, are formed at an edge of the fringe section 5a. Input signals to the input terminals 13 include synchronization signals (vertical and horizontal synchronization signals) and digital display data from an external device (host system), and externally supplied voltage from an external power source.

In accordance with these inputs, the controller circuit 2 supplies a driving voltage output signal to the liquid crystal panel 5, via the SD1. Besides, the controller circuit 2 supplies control signals, display data DATA·RGB, the source voltage, and reference voltages, to the SD1, the SD2, . . . , and supplies control signals, the source voltage, and the negative voltage to the GD1 and the GD2.

With the foregoing structure, in the present display module, the controller circuit 2 equipped with the liquid crystal driving power source circuit 6, the gate electrode driving circuit 3, and the source electrode driving circuit 4 are all installed on the fringe section 5a of the liquid crystal panel 5.

Next, the following description will describe an example of installing the controller circuit 2 and the source driver SD1 on the TCP type film 12a.

Figure 3:
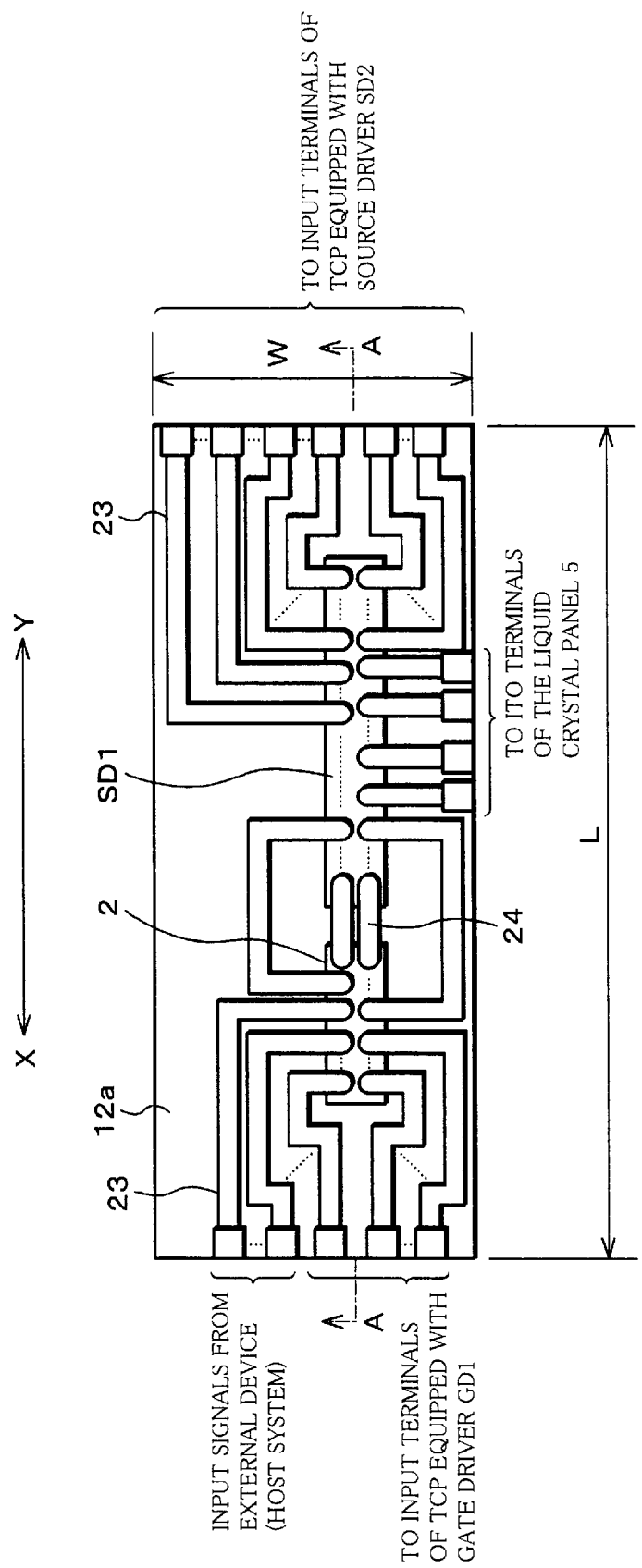
FIG. 3 is an explanatory view showing an example of installing the controller circuit and a source driver on a TCP type film shown in FIG. 1.

In an example shown in FIG. 3, the controller circuit 2 and the source driver SD1 are aligned in an X-Y direction in FIG. 3, that is, in a direction parallel to a direction in which the source drivers SD1 through SD8 are aligned. Thus, the TCP type film 12a is formed in a laterally long shape.

Generally, the source driver SD1 is formed in a long and narrow shape, as a plurality of output terminals for driving are connected to the ITO terminals of the liquid crystal panel 5. Since the source driver SD1 is formed in the above-mentioned shape, the width W required for the TCP type film 12a (the dimension of the fringe section 5a in a width direction) becomes narrow. Thus, even when the fringe section 5a of the liquid crystal display 5 is narrow, the controller circuit 2 and the source driver SD1 can be installed on the TCP type film 12a.

Figure 4:
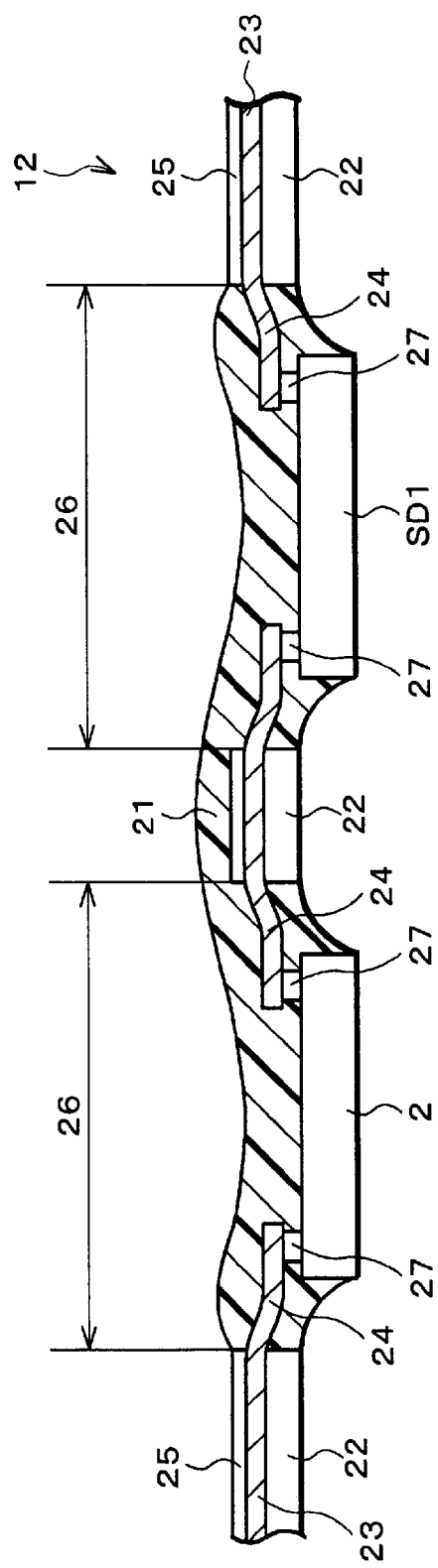
FIG. 4 is a sectional view taken along a line A—A in FIG. 3.

Further, a cross-sectional structure of the arrangement shown in FIG. 3 will be shown in FIG. 4, which is a sectional view taken along a line A—A in FIG. 3. In the structure shown in FIG. 4, the controller circuit 2 (controller LSI chip) and the source driver SD1 are fixed to an insulating base tape 22 by a resin layer 21. Further, the above two elements are protected by being sealed with the resin layer 21. A wiring pattern 23 is covered and protected by a solder resist film 25. An inner lead section 24 of the wiring pattern 23 is projected to a device hole 26 provided in the base tape 22. The controller circuit 2 and the source driver SD1 are electrically connected via Au bumps 27 formed on electrodes of these chips and the inner lead section 24. With this structure, the controller circuit 2 and the source driver SD1 are combined as one TCP.

In the TCP type film 12 (12a), the base tape 22 is made of, for example, a polyimide film with a thickness of 50 $\mu$m. On the polyimide film, for example, an electrolytic copper foil with a thickness of 18 $\mu$m and with the minimum wiring width of 30 $\mu$m is laminated via an adhesive layer, and provided as the wiring pattern 23. Further, an Sn plating is provided on its surface. Here, an electrolytic copper foil pattern, which is a conductor, may be formed directly on a material of the base tape 22, without using an adhesive layer.

Figure 5:
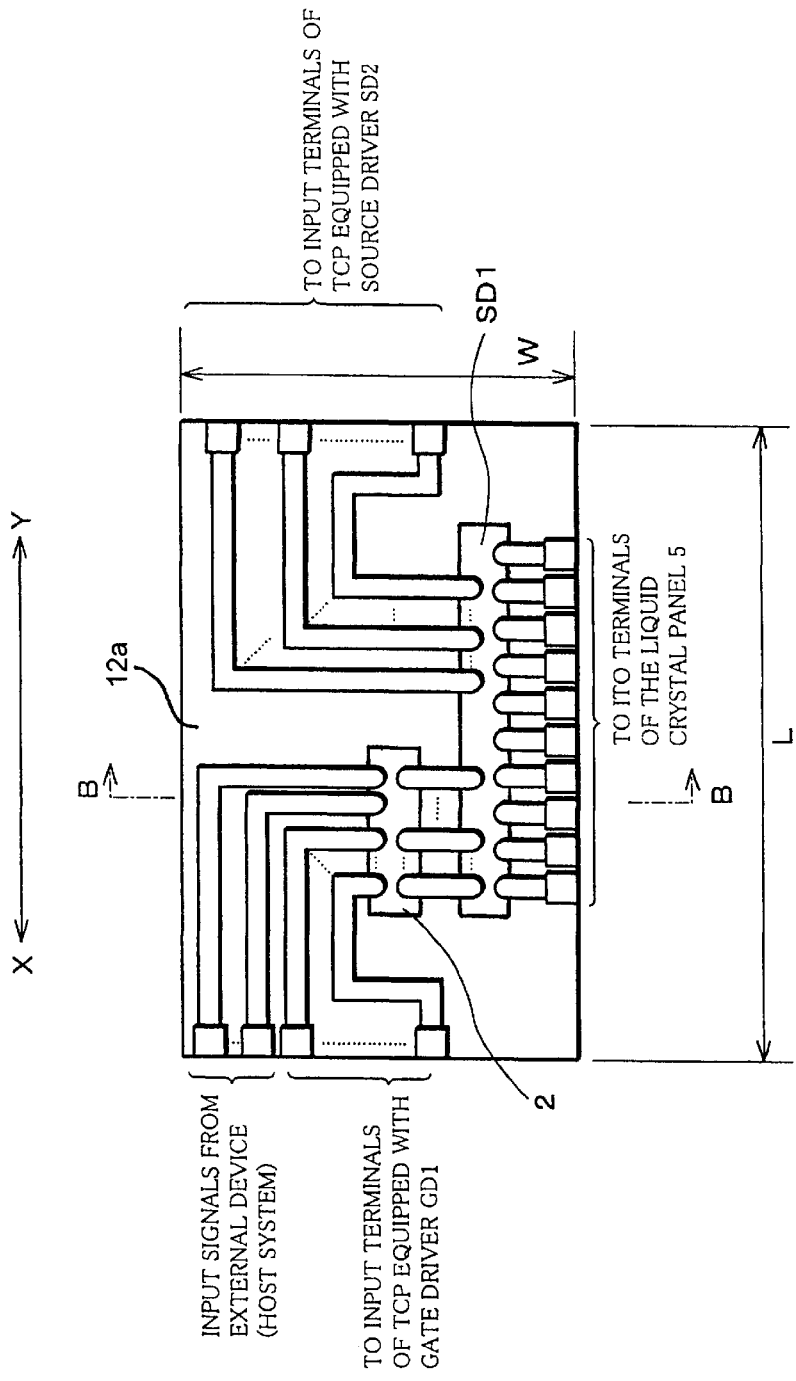
FIG. 5 is an explanatory view showing another example of installing the controller circuit and a source driver on the TCP type film shown in FIG. 3.

FIG. 5 shows another installation example of the controller circuit 2 and the source driver SD1 on the TCP type film 12a. In this example, the controller circuit 2 and the source driver SD1 are aligned in a direction orthogonal to an X-Y direction in FIG. 5, that is, in a direction orthogonal to a direction in which the source drivers SD1 through SD8 are aligned. Thus, compared with the example shown in FIG. 3, the TCP type film 12a in FIG. 5 has a wider width W and a shorter length L. Either of the installation structures may be chosen, considering the efficiency for installation to the liquid crystal panel 5. Here, a sectional view taken along a line B—B of the arrangement shown in FIG. 5 is almost identical to that of the arrangement shown in FIG. 3, which is shown in FIG. 4.

As shown in FIG. 6, the liquid crystal panel 5 can be shown in the form of an equivalent circuit of a TFT liquid crystal panel. The liquid crystal panel 5 is structured such that a voltage is applied to a liquid crystal layer between a display electrode 32 and a common electrode 33 opposing the display electrode 32. That is, a pixel 34 is composed of the display electrode 32 and the common electrode 33. Here, the display electrode 32 is an electrode connected to a TFT 31. The common electrode 33 is common to all the dots. A material with reference numeral 35 is an auxiliary capacitor.

When a positive voltage is applied (generally supplied from the gate drivers GD1 and GD2) to a gate electrode of the TFT 31, the TFT 31 is turned on. A liquid crystal load capacitor formed between the display electrode 32 and the common electrode 33 is charged by a voltage applied to the source drivers SD1 through SD8.

When a negative voltage is applied to the gate drivers GD1 and GD2, the TFT 31 is turned off. Here, the applied voltage at this point of time is maintained between the display electrode 32 and the common electrode 33.

The pixel 34 can maintain any value of voltage by applying a voltage to be written (generally supplied from the source drivers SD1 through SD8) to a source electrode and controlling a gate electrode. The transmittance of light in liquid crystal varies according to the maintained voltage, and thus an image with gradation can be displayed.

Figure 7:
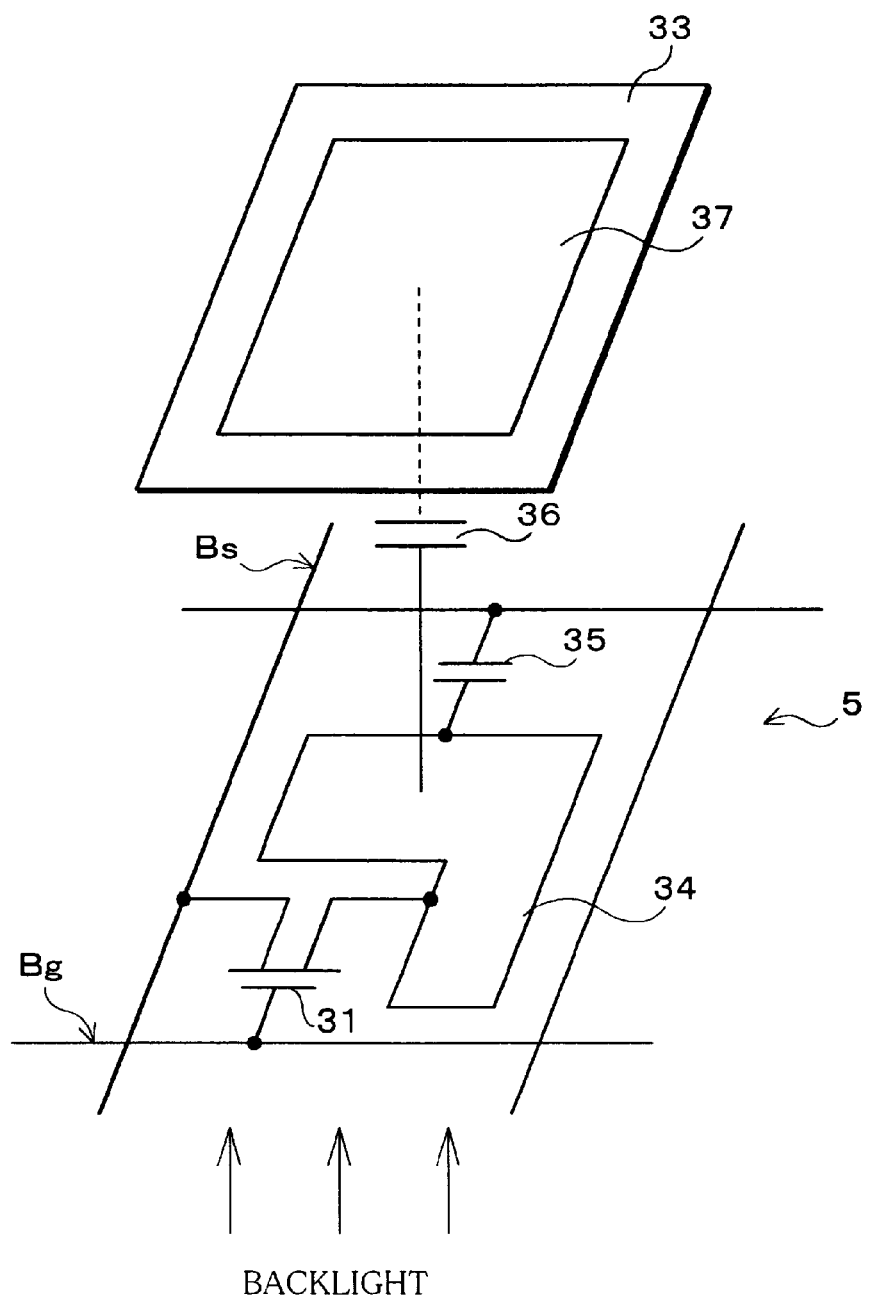
FIG. 7 is an equivalent circuit diagram at a portion in proximity to one pixel in the liquid crystal panel shown in FIG. 1.

Further, as shown in FIG. 7, a backlight is emitted from the back side of a liquid crystal 36 in which the transmittance varies. Then, the light passing through the liquid crystal 36 passes through a color filter 37, providing a color image display.

Figure 8:
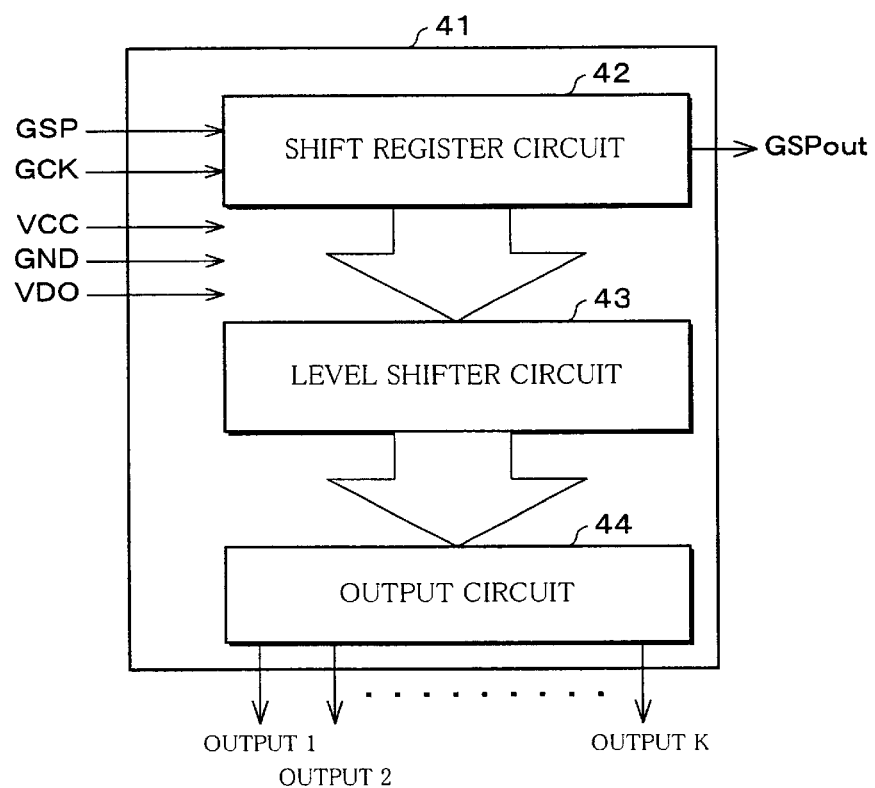
FIG. 8 is a schematic block diagram showing a structure of a gate driver LSI chip constituting a gate driver shown in FIG. 1.

Next, referring to FIG. 8, the following description will describe the gate drivers GD1 and GD2 constituting the gate electrode driving circuit 3. Since each of the gate drivers GD1 and GD2 has the same structure, FIG. 8 shows a block diagram of a circuit constituted by a gate driver LSI chip 41 (for example, the gate driver GD1).

The gate driver LSI chip 41 is composed of a shift register circuit 42, a level shifter circuit 43, and an output circuit 44. The shift register circuit 42 synchronizes the horizontal synchronization signal GCK, based on the vertical synchronization signal GSP. The shift register circuit 42 performs shift operation and supplies a selection pulse (corresponding to a scanning pulse). The selection pulse selects a pixel to be driven by the voltage supplied from the source electrode driving circuit 4, in the liquid crystal panel 5.

The level shifter circuit 43 converts the level of the selection pulse to a voltage level required to turn on/off the TFT 31, and transmits the converted pulse signal to the output circuit 44. The output circuit 44 amplifies the foregoing signal, and supplies it from output terminals. Each of outputs 1 through k supplied from the output circuit 44 is a pulse signal, and referred to as a gate pulse (scanning pulse).

Figure 9:
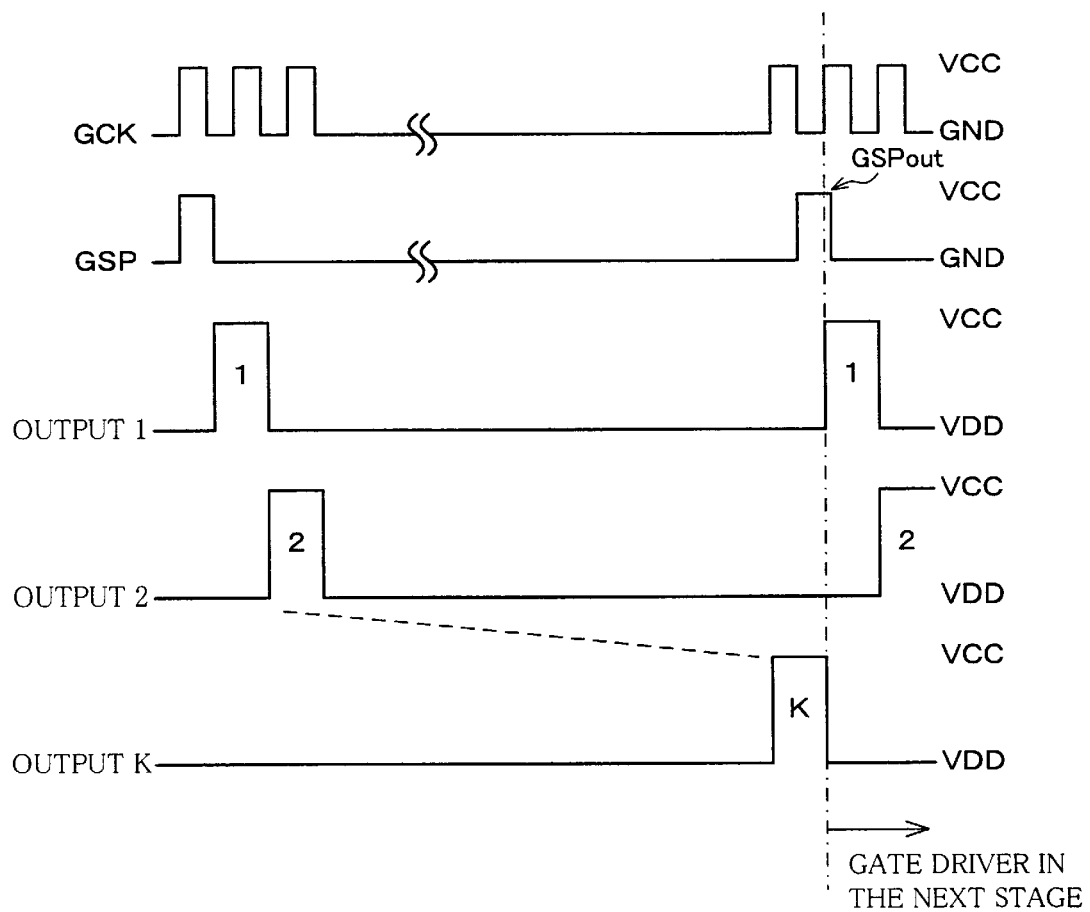
FIG. 9 is a timing chart of input/output signals to/from the gate driver LSI chip shown in FIG. 8.

FIG. 9 shows signal timings of the horizontal synchronization signal GCK, the vertical synchronization signal GSP, and the outputs 1 through k.

In FIG. 9, the GSP is supplied to an input stage of the shift register circuit 42 of the gate driver LSI chip 41 (the gate driver GD1). Here, the GSP is a vertical synchronization signal supplied from a GSPI terminal of the controller circuit 2 shown in FIG. 2, that is, a start pulse signal for the gate driver.

The GCK is supplied to an input stage of the shift register circuit 42, as a transfer clock of the shift register circuit 42. Here, the GCK is a horizontal synchronization signal supplied from a GCK terminal of the controller circuit 2 shown in FIG. 2, that is, a transfer clock signal for the gate driver.

The GSP synchronizes the rising of the transfer clock GCK, and is transferred in the shift register circuit 42. The signal supplied from each stage of the shift register circuit 42 is level-shifted and buffered. Then, as shown in FIG. 9, the GCK is supplied as the outputs 1 through k of the gate driver LSI chip 41.

The power source of the level shifter circuit 43 and its input/output signals are driven between the source voltage Vcc and the grounding voltage GND. The level shifter circuit 43 shifts the level of an input signal changing between the source voltage Vcc and the grounding voltage GND, to the level of an output signal changing between the source voltage Vcc and the negative voltage VDD. The GSP signal transferred to the last stage of the shift register circuit 42 in the gate driver GD1 is supplied as an output signal GSPout, and inputted as a GSP signal to the gate driver GD2 in the next stage, which is cascaded with the gate driver GD1. The inputted GSP signal is transferred and processed in the same way as in the foregoing case. Hereafter, the GSP signal is sequentially transferred, in this case, to the gate driver GD2, which is the last driver in the cascade connection.

Here, the signal GSP, the source voltage Vcc, the negative voltage VDD, and the grounding voltage GND are supplied to each gate driver GD in parallel via a separately provided common wiring substrate (not shown). Or, without using a common wiring substrate, cascade connection may be adopted using LSI internal wires, connecting LSI input terminals, LSI internal wires, LSI output terminals, TCP wires, and LSI input terminals in the next stage.

Figure 10:
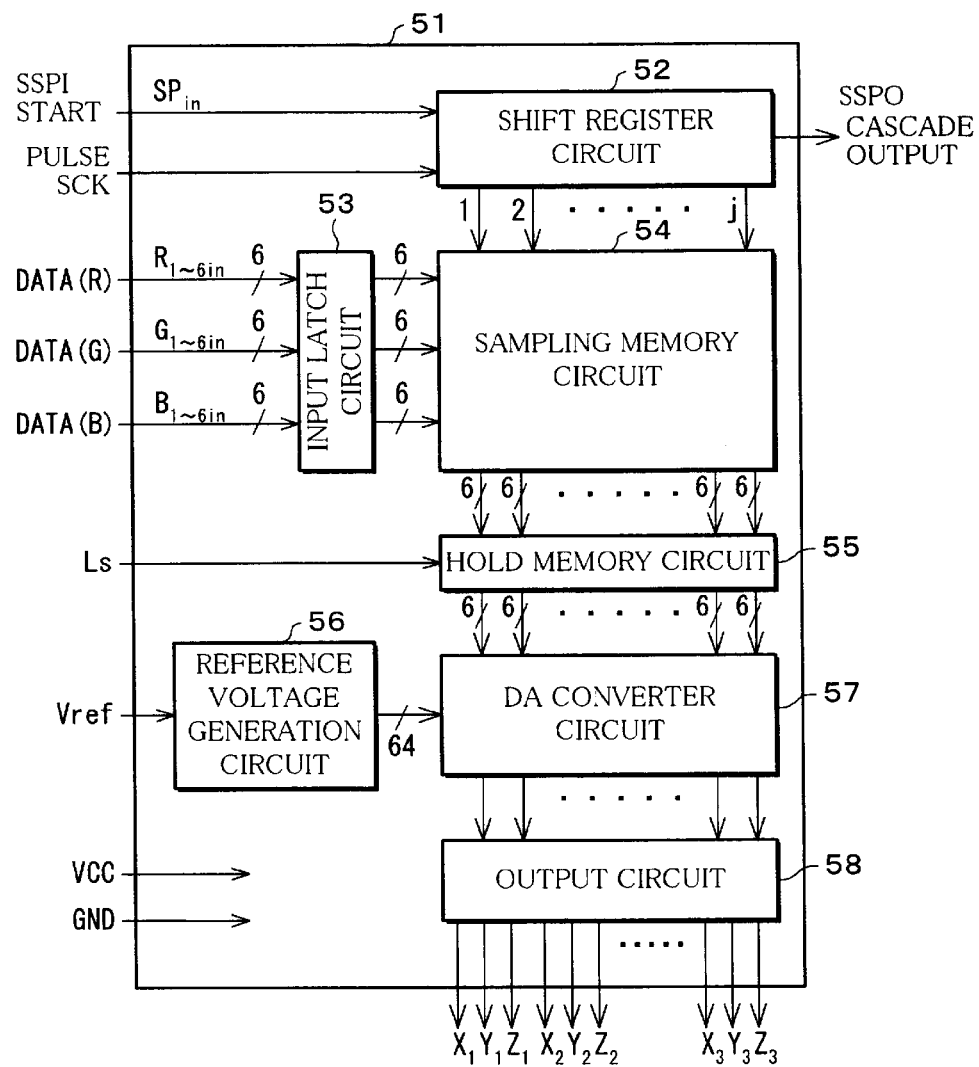
FIG. 10 is a schematic block diagram showing a structure of a source driver LSI chip constituting a source driver shown in FIG. 1.

Next, referring to FIG. 10, the following description will describe the source drivers SD1 through SD8 constituting the source electrode driving circuit 4. Here, FIG. 10 shows a block diagram of a circuit constituted by a source driver LSI chip 51 among the source drivers SD1 through SD8 (for example, the gate driver GD1).

The source driver LSI chip 51 is composed of a shift register circuit 52, an input latch circuit 53, a sampling memory circuit 54, a hold memory circuit 55, a reference voltage generation circuit 56, a DA converter circuit 57, and an output circuit 58.

The shift register circuit 52 uses a start pulse signal SSPI as a start pulse, and shifts the start pulse signal SSPI in the shift register circuit 52 in response to the clock signal SCK (reference signal) supplied from the SCK terminal of the controller circuit 2. The start pulse signal SSPI is supplied from the SSPI terminal of the controller circuit 2 (see FIG. 2), to a terminal Spin of the source driver LSI chip 51 installed on a tape carrier. Further, the start pulse signal SSPI synchronizes horizontal synchronization signals of the display data signals DATA·RGB (6 bits for each color).

The start pulse signal SSPI, inputted to the source driver LSI chip 51 and shifted in the shift register circuit 52, is outputted as a start pulse output signal SSPO from the last stage of the shift register circuit 52, that is, a terminal SPout of the source driver LSI chip 51, and inputted to the Spin of the next source driver LSI chip 51. Hereafter, the signal is sequentially transferred in the same manner. Incidentally, the SSPO signal supplied from the source driver SD8, the last stage, is inputted to an SSPO terminal of the controller circuit 2.

The display data signals DATA·RGB are supplied from R, G, and B terminals of the controller circuit 2, respectively, and each of the signals is composed of 6 bits. The display data signals DATA·RGB synchronizes the rising of a clock signal $\overline{SCK}$ (a reversed signal of the clock signal SCK). The display data signals DATA·RGB are supplied serially from the controller circuit 2 to terminals R1 through 6*in*, terminals G1 through 6*in*, and terminals B1 through 6*in* of the source driver SD1, respectively. Then, the display data signals DATA·RGB are temporarily latched by the input latch circuit 53, and transmitted to the sampling memory circuit 54.

The sampling memory circuit 54 performs a sampling of the display data signals DATA·RGB (6 bits for each color, 18 bits in total) transmitted by time sharing, in accordance with an output signal from each stage of the shift register circuit 52. Then, the sampling memory circuit 54 stores the sampled display data until the latch signal LS supplied from an LS terminal of the controller circuit 2 is inputted.

Next, the display data is supplied to the hold memory circuit 55. When data for one horizontal synchronization period of the display data signals DATA·RGB is inputted to the hold memory circuit 55, the display data is latched by the latch signal LS.

The hold memory circuit 55 holds the data until data for the next horizontal synchronization period is inputted to the sampling circuit 54. During this period, the display data signals are outputted via the output circuit 58. When the next latch signal LS is inputted, the hold memory circuit 55 captures a new data from the sampling memory circuit 54 and latches it.

The reference voltage generation circuit 56 generates 64 levels of voltages used for gradation display, for example, by resistance division, based on reference voltages generated in the liquid crystal driving power source circuit 6 of the controller circuit 2. The reference voltages are outputted from the terminals for Vref1 through Vref9 in the controller circuit 2, and inputted to the terminals for Vref1 through Vref9 in the source driver LSI chip 51.

The DA converter circuit 57 converts a digital signal to an analog signal. Specifically, the DA converter circuit 57 performs conversion by selecting one analog signal from the 64 levels of voltages in accordance with the digital display data having 6-bit data for each of RGB. Then, the output circuit 58 amplifies the analog signal selected from the 64 levels, and the amplified analog signal is supplied from output terminals $X_1$ through $X_{128}$, $Y_1$ through $Y_{128}$, and $Z_1$ through $Z_{128}$ shown in FIG. 10, to terminals (not shown) of the liquid crystal panel 5.

The output terminals $X_1$ through $X_{128}$, $Y_1$ through $Y_{128}$, and $Z_1$ through $Z_{128}$ correspond to display data signals RGB, respectively, and each group has 128 terminals. Besides, a Vcc terminal and a GND terminal of the source driver LSI chip 51 are terminals for supplying power to the source driver LSI chip 51. Here, in the present embodiment, the number of terminals in each group of the foregoing output terminals is determined at 128, but the present invention is not limited to this.

Figure 11:
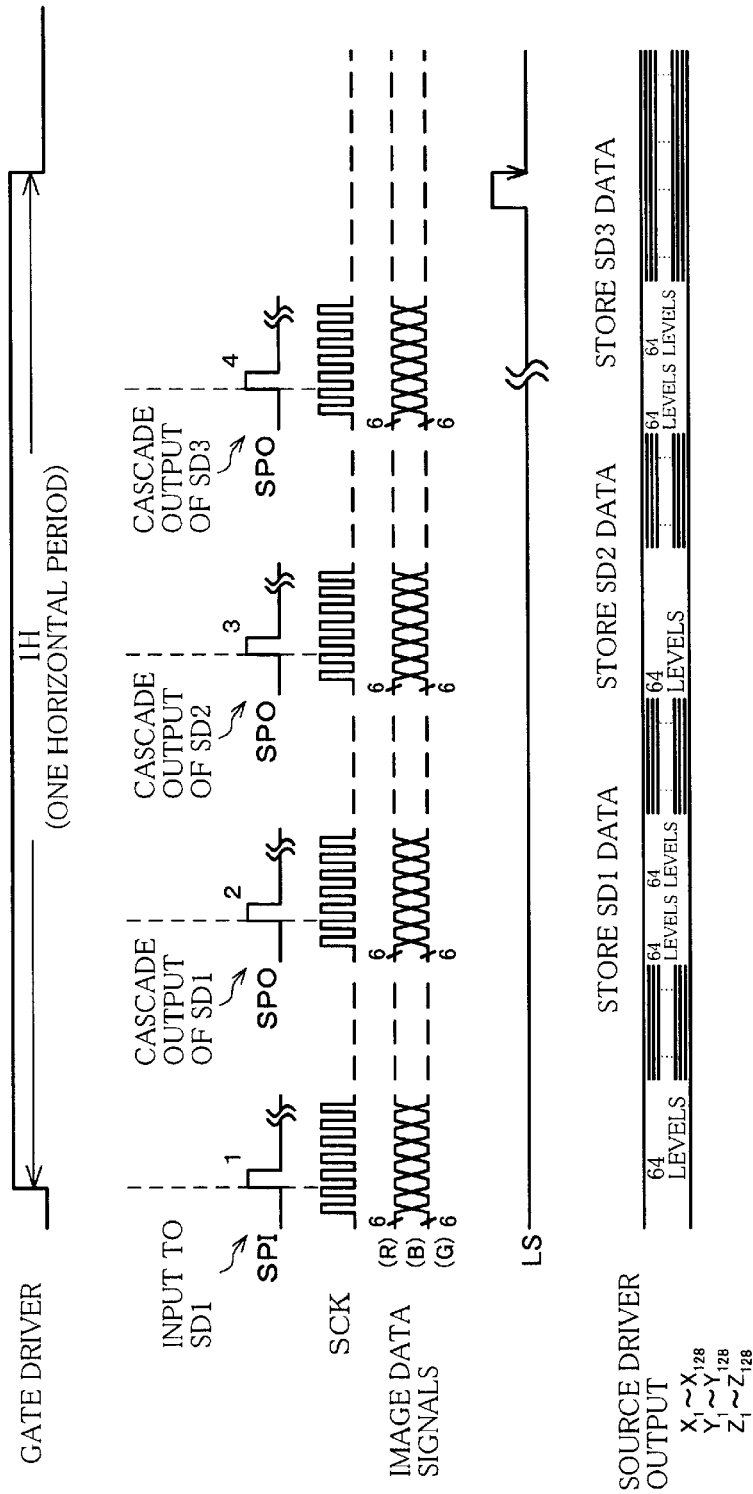
FIG. 11 is a timing chart of input/output signals to/from the source driver LSI chip shown in FIG. 10.

Up to this point, explanation has been given on the structure and operation of the source drivers SD1 through SD8 with 64-level gradation. FIG. 11 is a timing chart of main signals.

Figure 12:
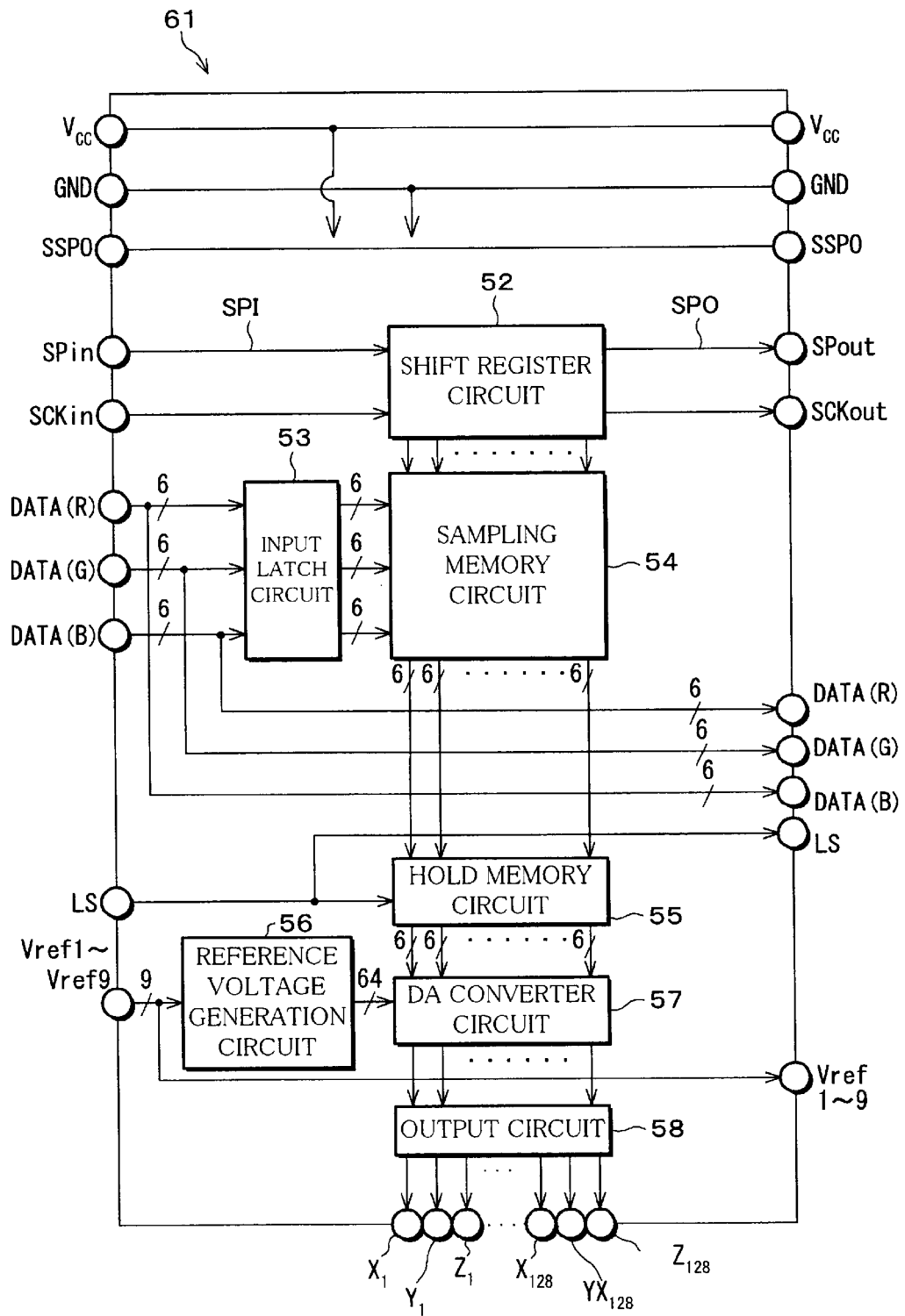
FIG. 12 is a schematic block diagram showing another example of the source driver LSI chip shown in FIG. 10.
Figure 13:
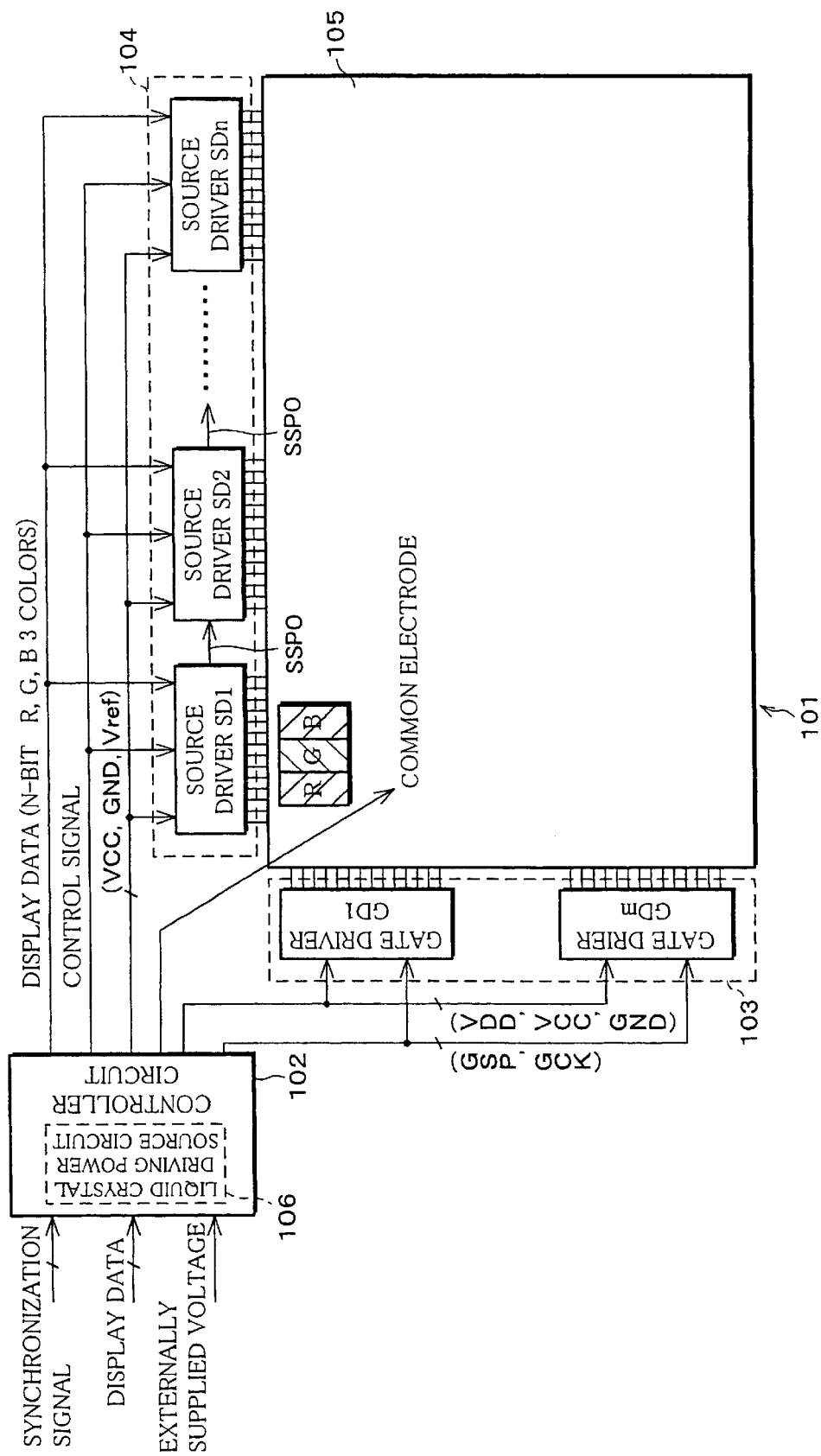
FIG. 13 is an explanatory view showing a structure of a conventional TFT liquid crystal display module.
Figure 14:
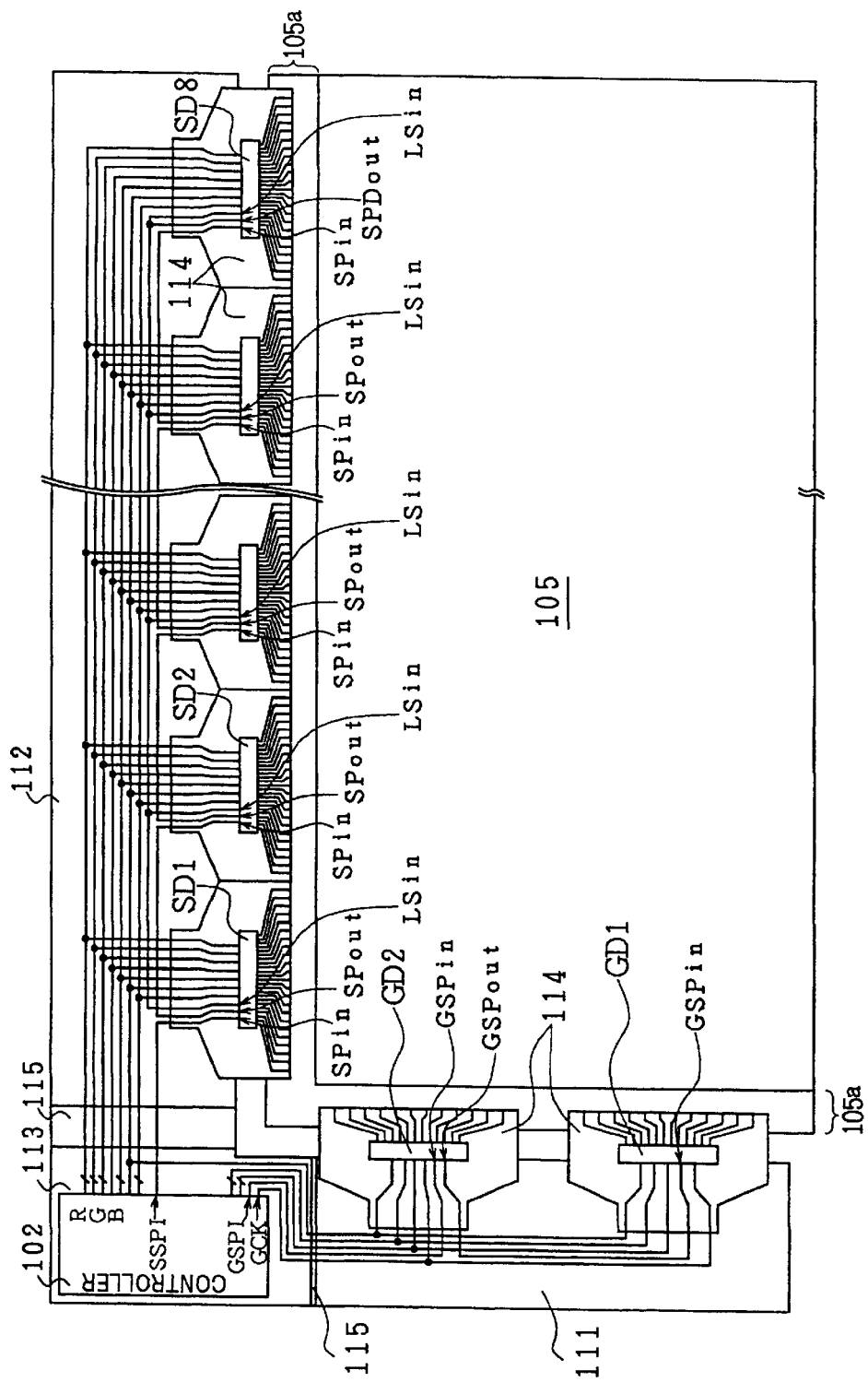
FIG. 14 is an explanatory view showing a specific installation structure of a conventional TFT liquid crystal display module.
Figure 15:
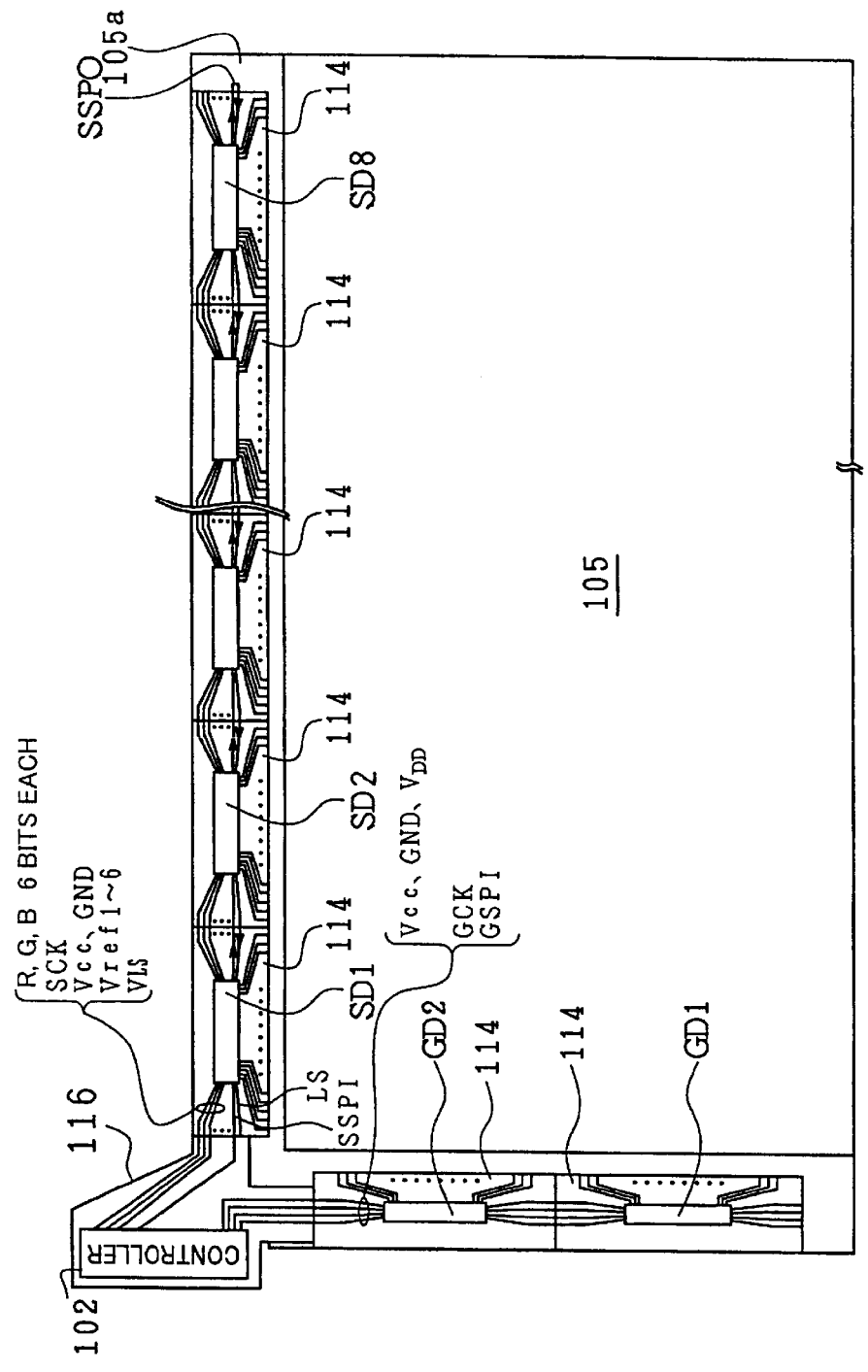
FIG. 15 is an explanatory view showing another structure of a conventional TFT liquid crystal display module.

Incidentally, the signals SCK, DATA·RGB, LS, and the voltages Vref, Vcc, and GND may be inputted to the source driver SD1 through SD8 in parallel, via a separately provided common wiring substrate (not shown). Or, without using a common wiring substrate, cascade connection may be adopted using LSI internal wires, for example, Al wires, to connect LSI input terminals, LSI internal wires, LSI output terminals, TCP wires, and LSI input terminals in the next stage. FIG. 12 shows a structure of a source driver LSI chip 61, which is the latter case.

As described above, the TFT liquid crystal module 1 of the present embodiment does not require a controller substrate which has been conventionally provided separately. Accordingly, the number of parts related to substrates such as a controller substrate and a flexible substrate can be reduced, achieving cost reduction.

Besides, this structure enables very short routing of the wiring for the transfer clock SCK and the display data, which are high-speed signals. Thus, noise jumping into the liquid crystal panel 5 can be reduced, improving display quality.

Further, the controller circuit 2, the gate drivers GDs, and the source drivers SDs, which are main means for driving the TFT liquid crystal display module 1, can be installed and fixed on the fringe section 5a of the liquid crystal panel 5. Therefore, the TFT liquid crystal display module 1 can be produced so as to be smaller, thinner, have a lighter weight, and to be integrated. With this structure, the reliability of the TFT liquid crystal display module 1 is improved. Besides, the TFT liquid crystal display module 1 can be handled more easily when installed into a system. Furthermore, the versatility of the TFT liquid crystal display module 1 is improved.

As described above, the source driver LSI chip 51 (the source driver SD1) and the controller LSI chip (the controller circuit 2) are installed on one TCP (the TCP type film 12a) and combined. With this structure, for example, when there occurs a specification change in the controller circuit 2, the specification change can be completed just by the design change in the controller circuit 2 (the controller LSI) and a TCP pattern. That is, compared with a case where the controller circuit 2 and the source driver SD1 are incorporated into one chip so as to obtain the same effect as that of the present invention, design change in the structure of the present embodiment can be performed more easily and inexpensively.

Further, electrical connection between the adjacent TCP type films 12 is established by overlapping and connecting the ends of the wires of the adjacent TCP type films 12, on which the source drivers are installed respectively. The electrical connection can be easily established without problems, even when connected by an ACF method or soldering using a separately-provided film substrate having wiring only, or using the ITO wires for connection provided on the liquid crystal display 5. Therefore, the TFT liquid crystal module 1 equipped with the controller circuit 2 can be provided inexpensively.

In a small-sized liquid crystal panel used in a portable device, when a combined TCP (the TCP type film 12a) provided with the controller circuit 2 and a source driver and a TCP (the TCP type film 11) provided with a gate driver are installed on the liquid crystal panel 5, a liquid crystal module equipped with a controller circuit can be easily constituted. When it is preferable that a power source line and a common line such as for a reference voltage have a low resistance, it is needless to say that a common wiring substrate may be used.

The foregoing explanation has been given on a case where an insulating film having a device hole is used as the TCP type film 12a on which the controller circuit 2 and the source driver SD1 are installed. However, the TCP type film 12a may be structured such that an LSI chip is installed on an insulating film having a wire which is not located at the device hole. The TCP type film 12a may also be structured such that, instead of the source driver SD1, the gate driver GD1 and the controller circuit 2 are installed on an insulating film (TCP type) and combined. However, considering the relationship with the output signals from the controller circuit 2, it is desirable that the controller circuit 2 is combined with the source driver SD1, since such a structure requires the least wiring.

The controller circuit 2 has been explained to be installed on the TCP type film 12a on which the first source driver SD1 is installed, but it may be installed on any of the TCP type films on which the source drivers SD1 through SD8 are installed respectively. However, considering the installation on the liquid crystal panel 5, the source driver appropriate for being installed together with the controller circuit 2 is the first one (the source driver SD1) or the last one (the source driver SD8). In this case, these installation structures can be easily achieved by providing wiring using the internal wires of the LSI chip. Further, it is preferable that the controller circuit 2 is provided in proximity to the first input stage of a cascaded start pulse signal, that is, the source driver SD1, considering easiness for transmitting the start pulse signal for the source driver; easiness for providing wiring to the gate driver GD; and the direction of transferring a signal and easiness for providing wiring when providing an output control circuit in the same way as a source driver described in Japanese Unexamined Patent Publication No. 2000-242240 (Tokukai 2000-242240, published on Sep. 8, 2000).

Besides, the foregoing explanation has taken the TFT liquid crystal display module 1 as an example. However, a structure in accordance with the present invention has the foregoing effects as long as it includes at least a display device, a plurality of, for example, cascaded driving devices for driving the display device, and a control device for controlling the driving devices. Incidentally, the present invention is effective for a display module in which the plurality of driving devices are separately installed on a plurality of insulating films having wiring. The present invention can be applied to various display devices, for example, a large screen display device in which a plasma display device is placed on the rear side of a liquid crystal display device.

In the above explanation, the controller circuit (control device) 2 includes the liquid crystal driving power source circuit 6. However, while the controller circuit 2 is manufactured under micromachining design rules, the liquid crystal driving power source circuit 6 is manufactured under relatively wide design rules. Therefore, not only a one-chip structure, where the liquid crystal driving power source circuit 6 is included in the controller circuit 2, but also a two-chip structure, where the controller circuit 2 and the liquid crystal driving power source circuit 6 are provided as two separate chips, are adopted in many applications. Therefore, the control device (including the controller circuit 2 and the liquid crystal driving power source circuit 6) may have a two-chip structure.

As has been described, a display module in accordance with the present invention is structured so as to include:

a display device driven by a driving signal in a column direction and a driving signal in a row direction;

a first driving device for supplying the driving signal in a column direction;

a second driving device for supplying the driving signal in a row direction;

a first wiring substrate for mounting thereon the first driving device;

a second wiring substrate for mounting thereon the second driving device; and a control device for controlling the first and the second driving devices, which is installed on the first or the second wiring substrate together with the first or the second driving device.

The foregoing display module may be structured such that the first and the second wiring substrates are made of insulating films having wiring.

According to the foregoing structure, the structure can be applied to a display module which uses an insulating film having wiring as a wiring substrate provided with a driving device, for example, a TCP (Tape Carrier Package) type film.

The foregoing display module may also be structured such that:

a plurality of the first driving devices and a plurality of the second driving devices are provided respectively;

the first and the second driving devices are installed on the respective first and second wiring substrates;

the plurality of the first driving devices and the plurality of the second driving devices are respectively cascaded so that the first driving devices and the second driving devices are respectively connected sequentially; and the control device is installed on an identical wiring substrate together with a driving device which is located first of the cascaded first or second driving devices.

According to the foregoing structure, the control device is installed on an identical wiring substrate together with a driving device which is located first of the cascaded first or second driving devices. With this structure, the control device can transmit control signals, for example, a start pulse signal of the driving device, to the cascaded driving devices more easily.

The foregoing display module may be structured such that:

the first driving device is a source driver;

the second driving device is a gate driver; and the control device is installed on a wiring substrate provided with the source driver.

According to the foregoing structure, when the first driving device is a source driver and the second driving device is a gate driver, the control device is installed on a wiring substrate which is provided with the source driver. With this structure, control signals can be transmitted efficiently in an arrangement having a source driver and a gate driver.

That is, the number of signal lines (the number of transmission signals) between the control device and the source drivers is greater than that between the control device and the gate drivers. Therefore, a structure where the control device is installed on a wiring substrate provided with a source driver can achieve a more compact wiring area.

With the structure that the control device is installed on a wiring substrate provided with a source driver, the routing of the wiring for the high-frequency clock signal SCK and bit lines for each of R, G, and B can be shortened, reducing the rounding of a signal wave and jump-in noise. Besides, since charging/discharging to/from a wiring capacitor is also reduced, driving capability required for a buffer circuit in an output stage can be reduced, and the reduction in the area of the buffer circuit and in current consumption can be expected.

The foregoing display module may also be structured such that the control device installed on the first or the second wiring substrate is positioned in close vicinity to both the first and the second driving devices.

According to the foregoing structure, the wiring from the control device to the first and the second driving devices can be shortened.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A display module comprising:

a display device driven by at least one driving signal in a column direction and at least one driving signal in a row direction;

a first driving assembly for supplying said driving signal in the column direction;

a second driving assembly for supplying said driving signal in the row direction;

at least one first wiring substrate for mounting thereon said first driving assembly;

at least one second wiring substrate for mounting thereon said second driving assembly; and a control device for controlling said first and second driving assemblies, which is installed directly on only one of said at least one first or second wiring substrate together with said first or second driving assembly, wherein the first and second wiring substrates are separate substrates.

2. The display module of claim 1, wherein: said first and second wiring substrates are made of insulating films having wiring.

3. The display module of claim 1, wherein:

the first driving assembly and the second driving assembly includes a plurality of first driving devices and a plurality of second driving devices, respectively;

the plurality of first and second driving devices are installed on the respective first and second wiring substrates;

the plurality of said first driving devices and the plurality of said second driving devices are respectively cascaded so that said first driving devices and said second driving devices are respectively connected sequentially; and said control device is installed on an identical wiring substrate together with a single driving device of the plurality of driving devices which is located first among the cascaded first or second driving devices.

4. The display module of claim 1, wherein:

said first driving assembly is a source driver; and said second driving assembly is a gate driver.

5. The display module of claim 1, wherein:

said control device is installed on a wiring substrate provided with a source driver.

6. The display module of claim 3, wherein:

output signals supplied from an external device to the wiring substrate provided with said control device include a synchronization signal, display data, and a voltage for generating reference voltages; and output signals supplied from said wiring substrate provided with said control device include a driving voltage for driving said display device, a control signal transmitted to a driving device cascaded to driving devices on said wiring substrate, and output data.

7. The display module of claim 1, wherein:

said at least one first and second wiring substrates are provided at a fringe section formed in a periphery of said display device.

8. The display module of claim 1, wherein:

said control device installed on said at least one first or second wiring substrate is positioned on a fringe of the display device between both said first and second driving assemblies.

9. The display module of claim 1, wherein:

said display module is a liquid crystal display module.

10. The display module of claim 1, wherein:

each of said first and second driving assemblies is composed of a LSI chip.

11. The display module of claim 3, wherein:

said control device and said single driving device are aligned in a direction parallel to a direction in which said plurality of-first driving devices are aligned.

12. The display module of claim 3, wherein:

said control device and said single driving device are aligned in a direction orthogonal to a direction in which said plurality of first driving devices are aligned.

13. The display module of claim 8, wherein:

said control device includes a liquid crystal driving power source circuit.

14. A display module comprising:

a display device driven by a driving signal in a column direction and a driving signal in a row direction;

at least one source driver for supplying said driving signal in the column direction;

at least one gate driver for supplying said driving signal in the row direction;

at least one first wiring substrate for mounting thereon said source driver;

at least one second wiring substrate for mounting thereon said date driver, which is separated from said first wiring substrate; and a control device for controlling said source driver and said gate driver, which is installed directly on only said first wiring substrate.

* * * * *